United States Patent [19]

Lindquist

[11] 3,709,080
[45] Jan. 9, 1973

[54] SHEET REDUCTION APPARATUS
[75] Inventor: Jesse L. Lindquist, Albany, Oreg.
[73] Assignee: Oregon Metallurgical Corporation, Albany, Oreg.
[22] Filed: July 24, 1970
[21] Appl. No.: 58,051

[52] U.S. Cl. ................... 83/355, 83/594, 83/677, 83/700, 83/906
[51] Int. Cl. .............................................. B23d 25/00
[58] Field of Search ........ 83/906, 355, 349, 43, 698, 83/700, 674, 677, 594

[56] References Cited

UNITED STATES PATENTS

| | | | |
|---|---|---|---|
| 3,545,689 | 12/1970 | Luscombe | 83/906 X |
| 2,819,747 | 1/1958 | Hervin | 83/355 X |
| 3,244,049 | 4/1966 | Smith et al. | 83/355 |
| 286,535 | 10/1883 | Everding | 83/906 X |
| 2,335,515 | 11/1943 | Jehle | 83/906 X |
| 3,587,373 | 6/1971 | Astrand | 83/906 X |
| 3,321,145 | 5/1967 | Gorman | 83/349 X |
| 2,655,213 | 10/1953 | Anderson | 83/906 X |

Primary Examiner—James M. Meister
Attorney—Kolisch & Hartwell

[57] ABSTRACT

Apparatus for subdividing sheets of material, such as thin sheets of titanium, into small coupons or pellets. Feed rollers are provided for selectively advancing the sheet material over the surface of an anvil having a front edge that extends in notched outline defining spaced-apart teeth. A unique arrangement of flying tools are radially mounted on discs stacked upon a rotatable arbor in front of the anvil, with the tools being adapted to intermesh with the anvil teeth and cut coupons from the sheet. The top of the anvil is located above the axis of rotation of the arbor so that the coupons are removed from the sheet by shearing action.

1 Claim, 4 Drawing Figures

PATENTED JAN 9 1973 3,709,080
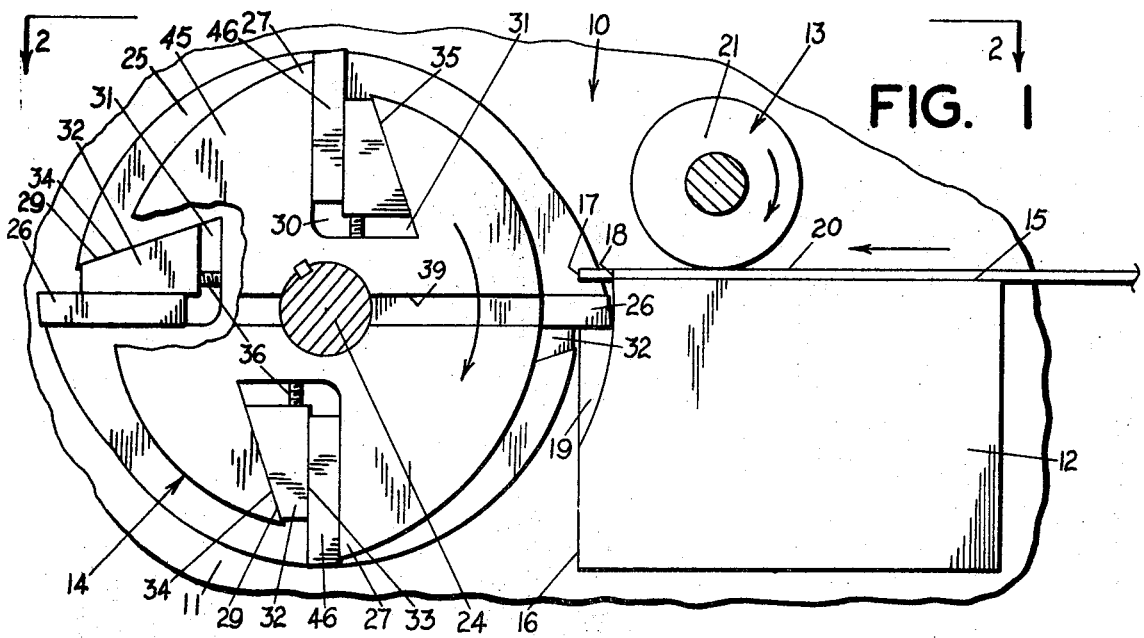
FIG. 1
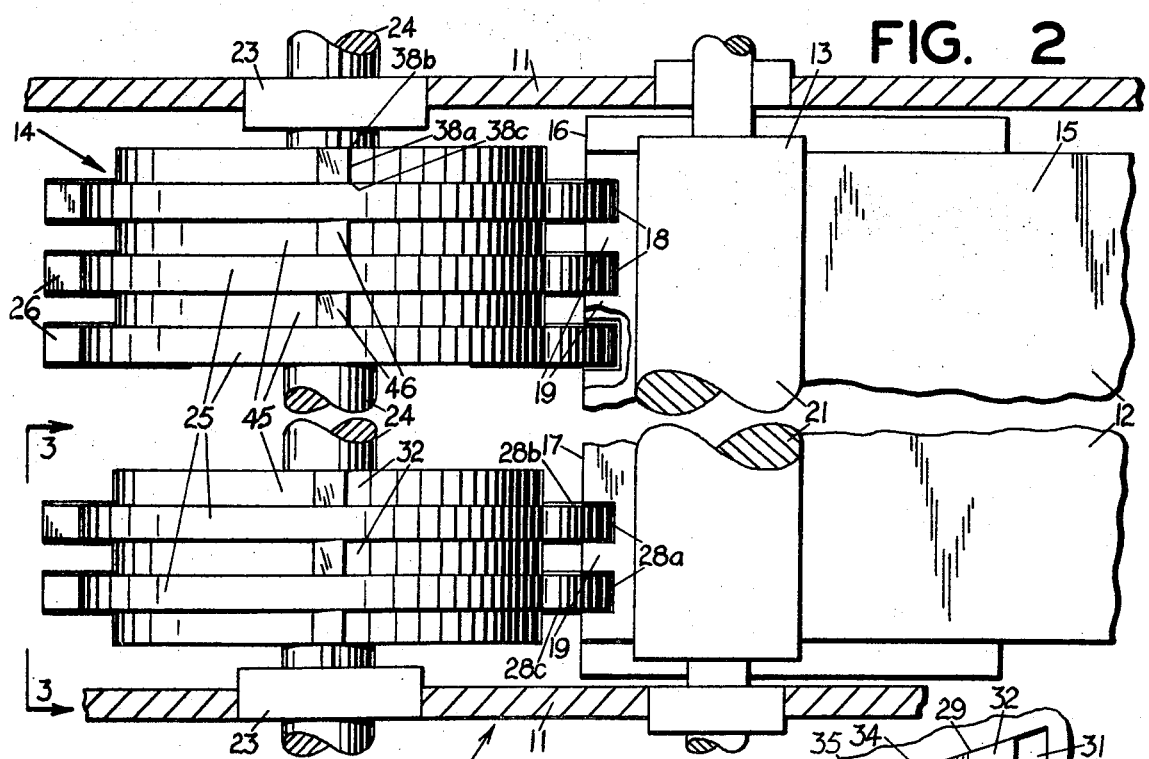
FIG. 2
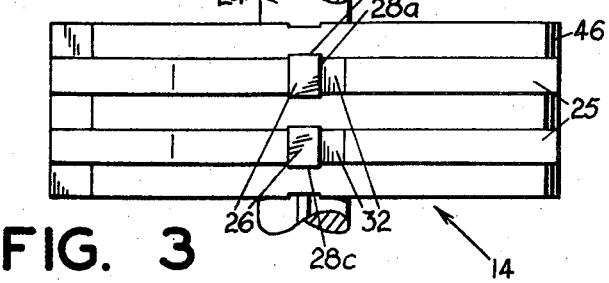
FIG. 3
FIG. 4
JESSE L. LINDQUIST
INVENTOR.
BY Kolisch & Hartwell
ATTY.

SHEET REDUCTION APPARATUS

BACKGROUND OF THE INVENTION

The present invention relates to apparatus for subdividing sheets of material into coupons or pellets. More particularly, the invention concerns improved apparatus for reducing thin sheets of material, such as metallic or other hard material, into small coupons or pellets.

Machines for dividing sheet material into pellets are well-known in the prior art. In particular, such machines are used for dicing sheets of elastomeric material into pellets for eventual use in molding or extrusion operations. In addition, it is often desirable to reduce thin sheets of metallic or other hard materials into small coupons ultimately utilized for various purposes.

For example, in reducing titanium which has a tendency to react readily with oxygen at high temperatures, it is common to utilize electric arc furnaces, operated with an inert atmosphere. In conventional operation, the electrodes used to sustain the arcs in such furnaces are formed of the material to be reduced, i.e., titanium. The electrodes are fabricated by molding or pressing small pellets of titanium into integral members of the desired size and shape. Since a significant portion of the available titanium is derived from scrap sources, it is necessary to provide means to reduce the sheets of titanium, that are often of odd size and irregular form, into small coupons.

One general type of machine used in the prior art for reducing sheet material into pellets includes a fixed, sheet-supporting anvil having teeth formed along one edge thereof. A rotatable arbor is mounted in front of the anvil having flying teeth secured thereto, adapted to intermesh with the arbor teeth and dice an elastomeric sheet into pellets as it is advanced over the anvil. A typical machine of this type is described in U.S. Pat. No. 2,812,815 to Quinsey et al.

The Quinsey apparatus is an improvement over other dicing machines in that it is capable of dicing sheets advanced at a faster rate than was previously possible. However, certain features of the Quinsey apparatus prohibit its use effectively with sheets of metallic or other hard material. For example, the rotatable arbor and the anvil of Quinsey are oriented in the same plane. Accordingly, the entire cutting surface of a tooth strikes the sheet simultaneously so that the coupon is "stamped" from the sheet. Clearly, if this apparatus was utilized to process titanium or other hard materials, the resulting tooth impact would result in breakage and excessive wear. In addition, in the Quinsey device, each set of flying teeth is comprised of the serrated edge of an integral cutter bar. Consequently, if a single tooth is damaged, it is necessary to remove and replace an entire cutter bar. Since tooth damage is expected in processing hard or metallic sheets, the use of the Quinsey apparatus for such a purpose would appear to be comparatively expensive. Finally, the cutting bars of the Quinsey apparatus are secured to the arbor only by bolts and lock nuts. In view of the tooth impact problem mentioned above, the cutter bars of the Quinsey apparatus would have an undesirable tendency to loosen after use, thereby requiring extra maintenance.

SUMMARY OF THE INVENTION

Accordingly, it is an object of the invention to provide an improved apparatus for subdividing sheets of material into small coupons or pellets which overcomes the disadvantages of conventional apparatus.

It is another object of the invention to provide an improved apparatus especially adapted for subdividing thin sheets of metallic or other hard material into coupons.

It is a further object of the invention to provide such apparatus wherein the tools for forming the coupons progressively engage the sheet material for separating the coupons from the sheet by shearing action rather than punching action.

It is yet another object of the invention to provide in such apparatus, improved means for coupling the cutting tools to the rotatable arbor.

It is yet a further object of the invention to provide such apparatus wherein the cutting tools can be individually removed and replaced when worn or broken.

Another object is to provide such apparatus featuring a disc type mounting for cutting tools therein.

These and other objects of the invention are attained by an apparatus for subdividing sheet material which includes feed rollers for selectively advancing sheet material against a surface of a fixed anvil having a front edge that extends in notched outline to define spaced-apart teeth. A plurality of flying tools are radially mounted in a set of large discs stacked on a rotatable arbor in front of the anvil. The tools are adapted to intermesh with the arbor teeth and, upon rotating act to serrate the front edge of the sheet and form coupons. Alternating with the large discs are small discs which support flying tools radially spaced by 90° from the tools on the large discs. The tools on the small discs oppose the arbor teeth and, upon rotation, act to shear off the serrated edge of the sheet and form additional coupons. Each of the tools is retained in a slot within a corresponding disc by a unique wedge-shaped lock. The top of the anvil is located above the axis of rotation of the arbor whereby the cutting surfaces of the tools progressively engage the sheet rather than impacting against it.

BRIEF DESCRIPTION OF THE DRAWINGS

These and other objects of the invention will become more apparent from the following detailed description of the invention taken in conjunction with the accompanying drawings, wherein:

FIG. 1 is a side elevation view, in section, of apparatus designed in accordance with the present invention;

FIG. 2 is a top elevation view in partial section, of the apparatus of FIG. 1;

FIG. 3 is a fragmentary front elevation view of the rotating arbor of the apparatus illustrated in FIG. 1; and FIG. 4 is an enlarged fragmentary view, in section, of a cutting tool mounted within a disc.

DETAILED DESCRIPTION OF THE INVENTION

Referring now to the drawings, one embodiment of the invention is illustrated in the form of a sheet reducing apparatus generally indicated at 10. The apparatus generally comprises a frame 11, a fixed anvil 12 secured to the frame, sheet advancing means 13 associated with the anvil, and a rotatable cutter 14 mounted on the frame in front of the anvil. In operation, sheets of material to be reduced into coupons are selectively advanced over the top of the anvil from right to left as viewed in FIG. 1. Cutter 14 is adapted for rotation, by power means not shown, in a clockwise direction as viewed in FIG. 1 to remove coupons from the advancing sheet material. The coupons, upon removal, drop into a collection tray not shown, beneath the apparatus.

The anvil has a rectangular, planar top surface 15 disposed in a horizontal plane, and a front surface 16 oriented normal to the plane of top surface 15 defining a front edge 17. The front and top surfaces of the anvil are formed with a plurality of parallel, vertical recesses 18 formed therein, spaced at predetermined intervals to define spaced-apart teeth 19 along the front edge of the anvil. The recesses are of rectangular cross section, each having a bottom surface that defines a curved, generally concave outline beginning at the top of the anvil and terminating at the front of the anvil as shown in FIG. 1. The recesses are adapted for the passage of flying tools therethrough to shear coupons from a sheet retained on the anvil, in a manner explained in detail hereinafter.

The sheet advancing means is of conventional design and can comprise a power-driven pressure roller adapted to grip and selectively advance sheets of material (such as sheet 20) in a predetermined manner. A roller 21 is illustrated in FIG. 1, adapted to be rotatably supported in frame 11 and power driven by means, not shown. Alternatively, a pair of rollers could be provided, located behind the anvil, to grip and advance the sheet. Other suitable means for advancing sheets of material across the top surface of the anvil could be utilized, as well. For example, the top surface of the anvil could be inclined and the sheets would then be advanced by gravity force toward the cutter.

Cutter 14 includes a shaft or arbor 24, supported in front of the anvil in bearings 23 attached to housing 11 at either end of the shaft. The arbor is adapted for rotation, by power means not shown, in a clockwise direction as shown in FIG. 1. A number of flat-sided, generally circular discs are stacked upon the shaft and secured for rotation therewith. Each disc supports one or more flying tools.

A first plurality of large discs 25 are provided on the shaft stacked alternately with a second plurality of small discs 45. The large discs carry tools 26 adapted to fly through the recesses in the anvil and intermesh with the teeth on the anvil. In the embodiment illustrated, each large disc 25 supports two tools, with the tools extending substantially radially from the center portion of the disc on opposite sides thereof. However, a single tool could be provided on each disc or a greater number of tools could be used on each disc without departing from the scope of the invention.

Tools 26 are elongate and are illustrated as being fabricated of square stock. However, other suitable shapes could be used as well. Each tool is provided with cutting edges at an outer end thereof, including an edge 28a at the end of the tool and parallel cutting edges 28b, 28c extending substantially radially from the cutter along the sides of the outer end of the tool. All of the tools are oriented to pass successively through a corresponding recess with the tool cutting edges generally matching edges of the anvil teeth. However, a suitable cutting tolerance is provided between the tool cutting edges and the edges of the anvil teeth whereby the flying tools do not contact the anvil. Tools 26 are slightly wider than discs 25 to provide ample clearance for the surfaces of the discs that pass through the recesses.

The outer end of each tool is supported by a projection 27 that extends from the main portion of the disc. Projections 27 provide backing for the cutting end of the tool and reduce tool chatter when hard materials are being processed.

Each tool 26 is secured in a tool slot 29 formed in the central portion of the disc as best illustrated in FIG. 4. Each tool slot 29 comprises an elongate portion 30 normally occupied by the tool and an adjacent portion 31, bounded by an inclined wall 35, normally occupied by a tool lock 32. The tool lock is a generally wedge-shaped element having a straight side 33 adapted to engage one side of the tool and an inclined side 34 adapted to engage inclined wall 35. Each tool lock is formed with an internal threaded bore 37 extending therethrough, adapted to receive a headless screw 36. Screw 36 extends completely through bore 37 to engage the back of the tool slot. As screw 36 in turned into the threaded bore, it forces the tool lock away from the center of the disc and firmly clamps the tool in the slot. The design of the tool slot, providing access of screw 36 from the front of the arbor, permits easy removal and replacement of the tools.

Small discs 45 support tools 46, with the tools being adapted to oppose the anvil teeth for cutting coupons from the sheet at the outer end of the anvil teeth. In the embodiment illustrated, each disc 45 is provided with two tools, secured to the disc in the same manner as are tools 26. However, it should be apparent that a single tool could be provided on each of the small discs or that a greater number of tools could be used on each of the small discs without departing from the scope of the invention. Discs 45 are oriented so that tools 46 are spaced along the periphery of the arbor in between tools 26, i.e., at 90° angles with respect thereto. Each tool 46 includes an outer cutting edge 38a of identical width to the corresponding cutting edge 28a of tool 26. The tools can further include similar cutting edges 38b and 38c permitting interchanging of tools 46 with tools 26, although this is not required. Since tools 46 do not fly through the anvil recesses, discs 45 can be the same width as the tools. Therefore, discs 45 are slightly wider than discs 25. The discs otherwise differ in that the sides of discs 45 include relieved portions 39, that receive the sides of tools 26 and permit close stacking of all the discs on the arbor. The stacked discs are retained together by suitable means, such as screws not shown, for forming an integral cutter.

In operating the apparatus described for forming coupons, shaft 24 is rotated at a predetermined speed. The sheet can be continuously advanced at a predetermined rate. Alternatively, the shaft position can be correlated with the sheet advancing means and the sheet advanced intermittently for the successive removal of coupons by the tools on the large discs and the tools on the small discs. Since the tools on the small discs overlap the tools on the large discs, effective separation of the coupons is attained in either mode of operation.

Since the surface of the anvil is offset from the axis of rotation of the arbor, the cutting edges of the tools, and particularly those of tools 26, engage the sheet progressively. Thus, the coupons are removed from the sheet by shearing action without violent impact between the tools and the sheet.

In the embodiment described, the coupons removed by tools 26 are slightly larger than the coupons removed by tools 46. This has not been found to be objectionable where the coupons are used for the purpose described. However, if desired, disc and tool sizes could be selected so that all the coupons formed are of the same size.

It is claimed and desired to secure by Letters Patent:
1. Sheet reducing apparatus comprising
a framework,
anvil means associated with said framework having a surface for supporting material to be reduced into coupons,
a rotatable arbor associated with said anvil including a first plurality of discs mounted thereon and a second plurality of discs mounted thereon interspersed with the discs of said first plurality, tool portions mounted on said first and said second plurality of discs that extend radially outwardly from the arbor and the discs mounting the tool portions, the tool portions mounted on the discs of said first plurality extending radially further than the tool portions mounted on the discs of said second plurality, the tool portions mounted on the discs of said first plurality having outer extremities that are wider than the discs of said first plurality and said other extremities on rotation of the arbor moving in paths that project into the cutting paths defined by the tool portions on the discs of said second plurality.

* * * * *